United States Patent
Bosley (10) Patent No.: US 7,279,803 B1
(45) Date of Patent: Oct. 9, 2007

(54) OCEAN CURRENT POWER GENERATOR

(76) Inventor: Kenneth Randall Bosley, 634 Country Club Ave., NE., Fort Walton Beach, FL (US) 32547-1762

( * ) Notice: Subject to any disclaimer, the term of this patent is extended or adjusted under 35 U.S.C. 154(b) by 50 days.

(21) Appl. No.: 10/907,826

(22) Filed: Apr. 17, 2005

(51) Int. Cl.
 *F03B 13/00* (2006.01)
 *F03D 9/00* (2006.01)

(52) U.S. Cl. .................. 290/54; 290/43; 290/44; 290/55

(58) Field of Classification Search ........... 290/42, 290/43, 44, 45, 52, 53, 54, 55; 310/74, 156, 310/154
See application file for complete search history.

(56) References Cited

U.S. PATENT DOCUMENTS

| | | | |
|---|---|---|---|
| 868,798 A | 10/1907 | McLaughlin | |
| 1,123,491 A | 1/1915 | Corbin | |
| 1,233,232 A * | 7/1917 | Heyroth | 290/55 |
| 1,944,239 A * | 1/1934 | Honnef | 290/55 |
| 2,730,631 A | 1/1956 | Dandini | 290/54 |
| 3,209,156 A | 9/1965 | Struble, Jr. | 290/54 |
| 3,604,942 A | 9/1971 | Nelson | 290/54 R |
| 3,912,937 A | 10/1975 | Lesser | 290/43 |
| 3,928,771 A | 12/1975 | Staumsnes | 290/43 |
| 4,026,587 A | 5/1977 | Hultman et al. | 290/53 |
| 4,256,970 A | 3/1981 | Tomassini | 290/53 |
| 4,289,970 A * | 9/1981 | Deibert | 290/44 |
| 4,306,157 A | 12/1981 | Wracsaricht | 290/54 |
| 4,330,714 A * | 5/1982 | Smith | 290/55 |
| 4,335,319 A | 6/1982 | Mettersheimer, Jr. | 290/54 |
| 4,464,080 A | 8/1984 | Gorlov | 405/76 |
| 4,520,273 A | 5/1985 | Rowe | 290/54 |
| 4,524,285 A | 6/1985 | Rauch | 290/43 |
| 4,720,640 A * | 1/1988 | Anderson et al. | 290/43 |
| 5,230,215 A | 7/1993 | Nagata | 60/502 |
| 5,440,176 A | 8/1995 | Haining | 290/54 |
| 6,006,518 A | 12/1999 | Geary | 60/398 |
| 6,064,123 A * | 5/2000 | Gislason | 290/55 |
| 6,160,336 A * | 12/2000 | Baker et al. | 310/74 |
| 6,452,287 B1 * | 9/2002 | Looker | 290/55 |
| 6,472,768 B1 | 10/2002 | Salls | 290/54 |
| 6,483,199 B2 * | 11/2002 | Umemoto et al. | 290/55 |
| 6,664,655 B2 * | 12/2003 | Vann | 290/55 |

(Continued)

FOREIGN PATENT DOCUMENTS

DE    39 24 673    2/1991

(Continued)

*Primary Examiner*—Nicholas Ponomarenko
(74) *Attorney, Agent, or Firm*—Stephen Christopher Swift (57) ABSTRACT

An apparatus and method for generating electricity from the movement of seawater in ocean currents. An impeller is set within a stationary frame. The impeller rotates around a non-moving shaft. There are four sets of electromagnetic coils, two of which are stationary, and two of which rotate with the impeller. The first set of coils is stationary. The second and third sets of coils rotate with the impeller. The second set of coils moves past the first set, generating an electric current which is used to energize the third set of coils. The fourth set of coils is also stationary. The third set of coils moves past the fourth set, generating another electric current, part of which is fed back to the first set of coils until they are brought to a maximum operating electro-magnetic field density, and part of which is transmitted externally to supply electric power on shore.

20 Claims, 8 Drawing Sheets

U.S. PATENT DOCUMENTS

| | | | |
|---|---|---|---|
| 6,727,600 B1 * | 4/2004 | Abdurachmanov | 290/54 |
| 6,849,965 B2 * | 2/2005 | Le Nabour et al. | 290/55 |
| 7,116,006 B2 * | 10/2006 | McCoin | 290/54 |

FOREIGN PATENT DOCUMENTS

| | | |
|---|---|---|
| GB | 2 104 974 | 3/1983 |
| GB | 2 256 011 | 11/1992 |
| JP | 52-29547 | 3/1977 |
| JP | 55-69768 | 5/1980 |
| JP | 56-77565 | 6/1981 |

* cited by examiner

OCEAN CURRENT POWER GENERATOR

BACKGROUND OF THE INVENTION

1: Field of the invention

The present invention relates to the generation of electrical power, preferably using large hydro-turbines submerged in powerful ocean currents, but it may be adapted to tidal or weaker current applications.

2: Description of the Prior Art

There is an increasing need for greater amounts of electrical power, and an increasing desire to minimize pollution of the environment caused by generating the electrical power. Consequently, several imaginative techniques have been devised for harvesting power from the large-scale motions of seawater. E.g., the Gulf Stream along Florida's east coast transfers approximately 517 gigawatts of power northward, or about 4.5 petawatt/hours each and every year. Ocean currents are driven by heat differentials on the earth due to uneven insolation. The present invention addresses the difficulty in extracting usable portions of this low-density power in an economical way.

U.S. Pat. No. 868,798, issued on Oct. 22, 1907, to Robert McLaughlin, discloses a means for obtaining power from flowing water, including a screw propeller and a dynamo.

U.S. Pat. No. 1,123,491, issued on Jan. 5, 1915, to Elbert A. Corbin, discloses a power conversion plant for converting the energy in water currents into electricity, including a turbine and generator.

U.S. Pat. No. 2,730,631, issued on Jan. 10, 1956, to Juliana S. Dandini, discloses a water current-driven motor including a generator.

U.S. Pat. No. 3,209,156, issued on Sep. 28, 1965, to Arthur D. Struble, Jr., discloses an impeller driven underwater generator for converting the force of subsurface water currents into electrical energy. The instant invention is distinguishable, in that it includes two separate sets of rotor and stator coils, between which current is transmitted.

U.S. Pat. No. 3,604,942, issued on Sep. 14, 1971, to Curtis A. Nelson, discloses an underwater generator, having radially extending arms, each arm pivotally carrying a paddle that can both open and close against water current.

U.S. Pat. No. 3,912,937, issued on Oct. 14, 1975, to Jerome M. Lesser, discloses a submarine electrical energy generating apparatus, having a turbine with pivoting louvers. The instant invention is distinguishable, in that it includes two separate sets of rotor and stator coils, between which current is transmitted.

U.S. Pat. No. 3,928,771, issued on Dec. 23, 1975, to O. Robert Straumsnes, discloses a water current power generator system, including a ship anchored to the bottom, having an inlet and an outlet for water. The instant invention is distinguishable, in that it does not require the constant presence of a ship to generate electricity.

U.S. Pat. No. 4,026,587, issued on May 31, 1977, to Robert H. Hultman and Dennis C. Hultman, discloses an underwater turbine operated by ocean currents, with propeller blades outside a housing and a generator inside the housing.

U.S. Pat. No. 4,256,970, issued on Mar. 17, 1981, to Osvaldo Tomassini, discloses an apparatus for the exploitation of underwater currents for the production of electrical energy, in which a water driven rotor turns when current flows, causing gears to turn, that cause a shaft in a generator to turn. The instant invention is distinguishable, in that it does not require drive means such as gears between the rotor and generator.

U.S. Pat. No. 4,306,157, issued on Dec. 15, 1981, to Lazar J. Wracsaricht, discloses an underwater slow current turbo generator, having blades extending from a shaft in a spiral pattern, with a cylindrical housing surrounding the blades. The generator may be near and around the shaft, or alternatively in the cylindrical housing (column 7, lines 24-26). The instant invention is distinguishable, in that it includes two separate sets of rotor and stator coils, between which electric current is transmitted.

U.S. Pat. No. 4,335,319, issued on Jun. 15, 1982, to John H. Mettersheimer, Jr., discloses a hydro-electric power apparatus utilizing ocean currents, with a power house and crew housing at the surface, which is not required by the instant invention.

U.S. Pat. No. 4,464,080, issued on Aug. 7, 1984, to Alexander M. Gorlov, discloses a high volume tidal or current flow harnessing system, including a dam not required in the instant invention.

U.S. Pat. No. 4,520,273, issued on May 28, 1985, to Raymond A. Rowe, discloses a fluid responsive rotor generator, that can be placed on the bottom of the ocean to generate electricity from current flow. Magnets may be placed on the rotor blades, or the blades may themselves be magnetized. Wires are mounted on the framework about the rotor, so that electricity will be generated when the rotor turns. The instant invention is distinguishable, in that it includes two separate sets of rotor and stator coils, between which electric current is transmitted.

U.S. Pat. No. 4,524,285, issued on Jun. 18, 1985, to Hans G. Rauch, discloses a hydro-current energy converter, which can be mounted on a platform resting on the sea bed, to generate electricity from ocean currents. A current-driven rotor turns a shaft that turns a generator. The instant invention is distinguishable, in that its rotor is itself part of the generator.

U.S. Pat. No. 4,720,640, issued on Jan. 19, 1988, to Bjorn M. S. Anderson and Reinhold H. Ziegler, discloses a fluid powered electrical generator, with an impellor-rotor having blades connected at their outward ends by a ring containing the rotor element of a generator, surrounded by a ring-shaped (toroidal) outside support structure containing the stator element of a generator. The instant invention is distinguishable, in that it has two separate sets of rotor and stator elements between which current is transmitted.

U.S. Pat. No. 5,230,215, issued on Jul. 27, 1993, to Tsugio Nagata, discloses an ocean current power generation system, having cup-like current-receiving members that hang from a horizontal ring.

U.S. Pat. No. 5,440,176, issued on Aug. 8, 1995, to Michael L. Haining, discloses ocean current power generators supported on a tension leg platform not required by the instant invention.

U.S. Pat. No. 6,006,518, issued on Dec. 28, 1999, to Jeffrey B. Geary, discloses an ocean current energy converter, including a rotating canister with pivotal fins.

U.S. Pat. No. 6,472,768, issued on Oct. 29, 2002, to Darwin Aldis Sails, discloses a hydrokinetic generator, having a scoop-like structure that funnels water into a turbine.

Japanese Patent No. 52-29547, published on Mar. 5, 1977, inventor Yoshitaro Ikeda, discloses a power generator using sea current that constantly flows in a definite direction.

Japanese Patent No. 55-69768, published on May 26, 1980, inventor Taiji Kaiho, discloses two rotor type water turbines that are placed left and right and coaxially, that are anchored to the sea bottom, but suspended like kites in the water.

Japanese Patent No. 56-77565, published on Jun. 25, 1981, inventor Shizukiyo Kawasaki, discloses a tubular ocean current power generating system utilizing bottom current.

British Patent No. 2 104 974, published on Mar. 16, 1983, inventor David Meir Slonim, discloses a wave and current energy converter, including a bucket wheel or bucket chain.

German Patent No. 39 24 673, published on Feb. 14, 1991, inventor Dr. Matthias Kratofiel, discloses a generator driven by an impeller mounted in a sea bed housing that can swivel and has fins that align it with the flow of water.

British Patent No. 2 256 011, published on Nov. 25, 1992, inventor Peter Leonard Fraenkel, discloses a floating water current turbine system.

None of the above inventions and patents, taken either singly or in combination, is seen to describe the instant invention as claimed.

SUMMARY OF THE INVENTION

The present invention is an apparatus and method for extracting municipally significant quantities of electrical power from ocean currents, without the mechanical losses typically found in most underwater generators, without the transfer of electricity from rotating to non-rotating components, and without the maintenance challenges found in most approaches. In the preferred embodiments, a large-diameter marine screw (or "impeller") is harnessed to two generators linked in series and split between the rotating ("rotor") and non-rotating ("stator") parts of the hydro-turbine, the axis of which is located parallel to a prevailing ocean current. Optionally, the hydro-turbine is enclosed in a shroud designed to accelerate the current through a more constricted area.

Current undersea generation technology relies upon pressurized generators, or placing generators in water-tight hulls, to protect the electrical contacts from both the corrosive effects of seawater, and from the short-circuiting and arcing caused by the presence of a saline fluid in the circuit. Various schemes have been used to solve these problems, but they have all entailed significant degradation to operating efficiency, maintenance problems, durability limitations, and unacceptable reductions in the portion of the total energy extracted from the ocean's current.

The first preferred embodiment of the invention uses a large-diameter impeller (e.g., a marine screw ten, twenty, thirty or forty meters in diameter) to drive a double generator set, having one generator mounted around the shaft and the other generator mounted around the rim of the impeller. The rotation of a first set of ferromagnetic coils (on the inner rotor) past a second set of stationary ferromagnetic coils (on the inner stator) will generate a small electric current, which is used to energize a third set of ferromagnetic coils mounted around the rim of the turbine (on the outer rotor). As this third set of ferromagnetic coils moves past a fourth set of ferromagnetic coils on the stationary rim of the support structure (on the outer stator) another larger electric current is generated. A portion of this latter current is fed back into the first set of coils, until they are brought to a maximum operating electro-magnetic field density. As the third set of coils reach their maximum field density, a maximum operating current will be generated in the fourth set of coils. This current is then transferred to shore via an undersea power transmission line.

Accordingly, it is a principal object of the invention to provide a means of reliably generating significant quantities of electrical energy from the kinetic energy of ocean currents.

It is another object of the invention to maximize the amount of electricity generated from ocean currents, by generating electricity as directly as possible, without mechanical losses due to gears and seals, or electrical losses due to brushes or inductive transferal technologies. By using the split-series double-generator set, all transfer of electricity from rotating to non-rotating parts is eliminated, thus avoiding the mechanical losses common to other generating technologies.

It is a further object of the invention to eliminate several categories of maintenance problems, thus reducing the operating cost and increasing the reliability of the generator. By using the split-series double-generator set, all transfer of electricity from rotating to non-rotating parts is eliminated, along with pressure hulls, high-speed gear sets, brushes, seals, and other mechanical and electrical sources of power loss, maintenance difficulties, and hazards to marine life.

Still another object of the invention is to provide a means by which the required power generating capacity can be tailored, by using different sizes of generators, in a specific number, to meet local or regional power requirements.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a method and apparatus for generating power from fluid currents, having four sets of electromagnetic coils.

Figure 1:
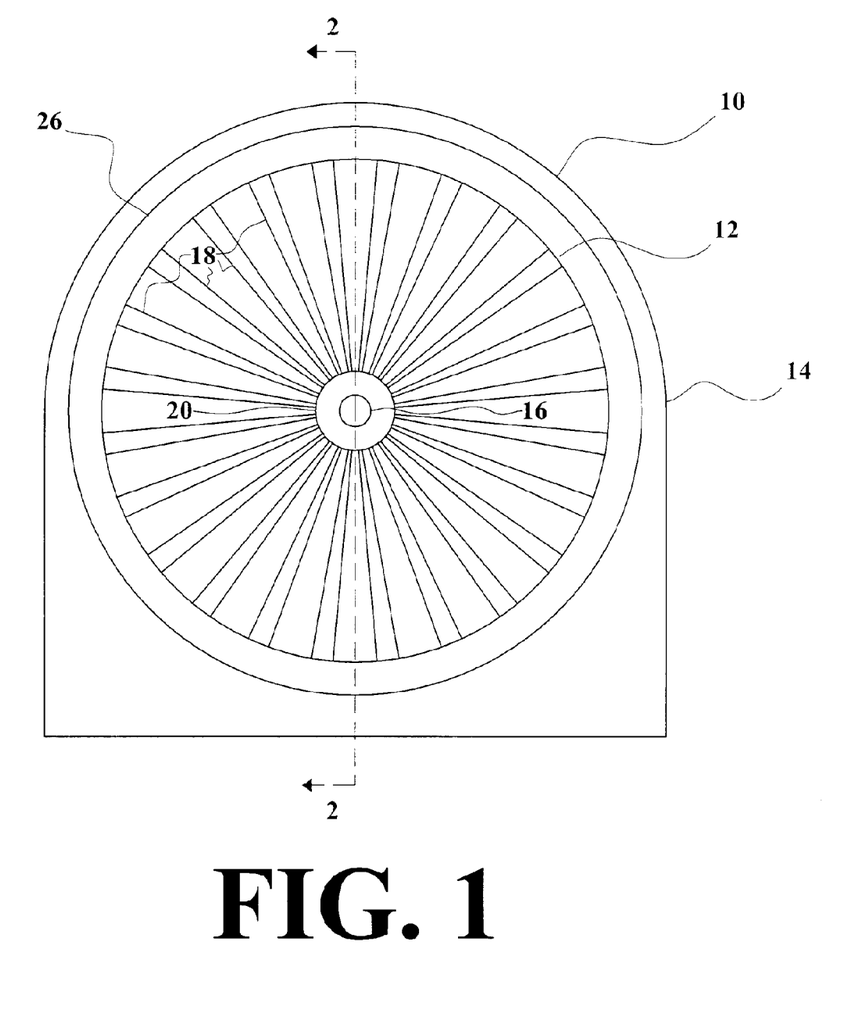
FIG. 1 is a front elevational view of the first preferred embodiment of the invention.

FIG. 1 is a front elevational view of the first preferred embodiment of the invention, showing the turbine 10, comprising the impeller 12, which is retained within the frame 14, and rotates on shaft 16. When a water current flows through the turbine, the impeller rotates, while the frame and shaft remain stationary. The pressure of water against blades 18 causes the impeller to turn. Also shown in FIG. 1 are the first set of electromagnetic coils 20 and the fourth set of electromagnetic coils 26.

Figure 2:
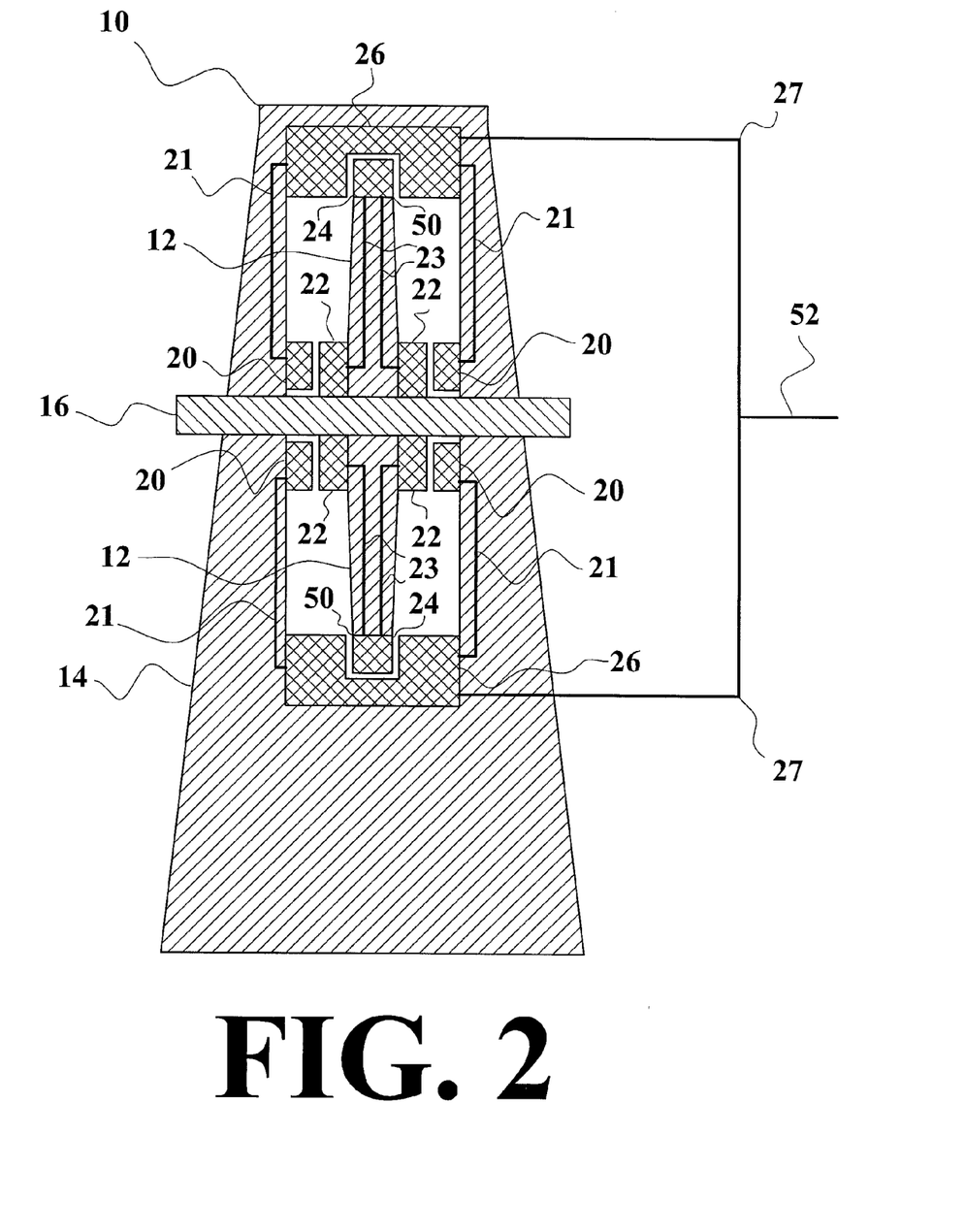
FIG. 2 is a sectional view of the first preferred embodiment of the invention drawn along line 2-2 of FIG. 1.

FIG. 2 is a sectional view of the first preferred embodiment of the invention drawn along line 2-2 of FIG. 1, showing the first set of electromagnetic coils 20, which are attached to the shaft 16 (or to the frame 14 adjacent to the shaft) and thus are stationary, the second set of electromagnetic coils 22, which are near the shaft but are attached to the impeller 12 and thus rotate with the impeller, the third set of electromagnetic coils 24, which are attached to the rim or periphery 50 of the impeller and thus also rotate with the impeller, and the fourth set of electromagnetic coils 26, which are near the periphery of the impeller but are attached to the frame 14 and thus are stationary. Preferably, the first and second sets of coils encircle the shaft, while the third and fourth sets encircle the periphery of the impeller. The first and fourth sets of coils are electrically connected by power feeds 21, as are the second and third sets by power feeds 23.

Assuming (at least for the sake of illustration) that the water and the impeller are initially still, as current begins to flow through the turbine and the impeller begins to rotate, the rotation of the second set of coils past the first set generates a first electric current, which is then used to energize the third set by being transmitted through power feeds 23. As the third set of coils moves past the fourth set, a second electric current is generated, a portion of which is fed back from the fourth set to the first set through power feeds 21, until the first set of coils are brought to a maximum operating electro-magnetic field density. At this point, the motion of the second set of coils past the first set of coils will generate their maximum operating current, which will continue to be fed back from the second set to the third set of coils to bring the third set its maximum operating electro-magnetic field density. As the third set of coils' electro-magnetic field reaches its maximum field density, the maximum operating current will be generated in the fourth set of coils. Electric power may then be transferred from the fourth set of coils through power leads 27 to shore by an undersea power transmission line 52. One or more cables may be routed to one or more shore-based power transmission stations, where the electricity is conditioned and brought into phase with a local power grid, prior to being fed into the local grid.

Figure 3:
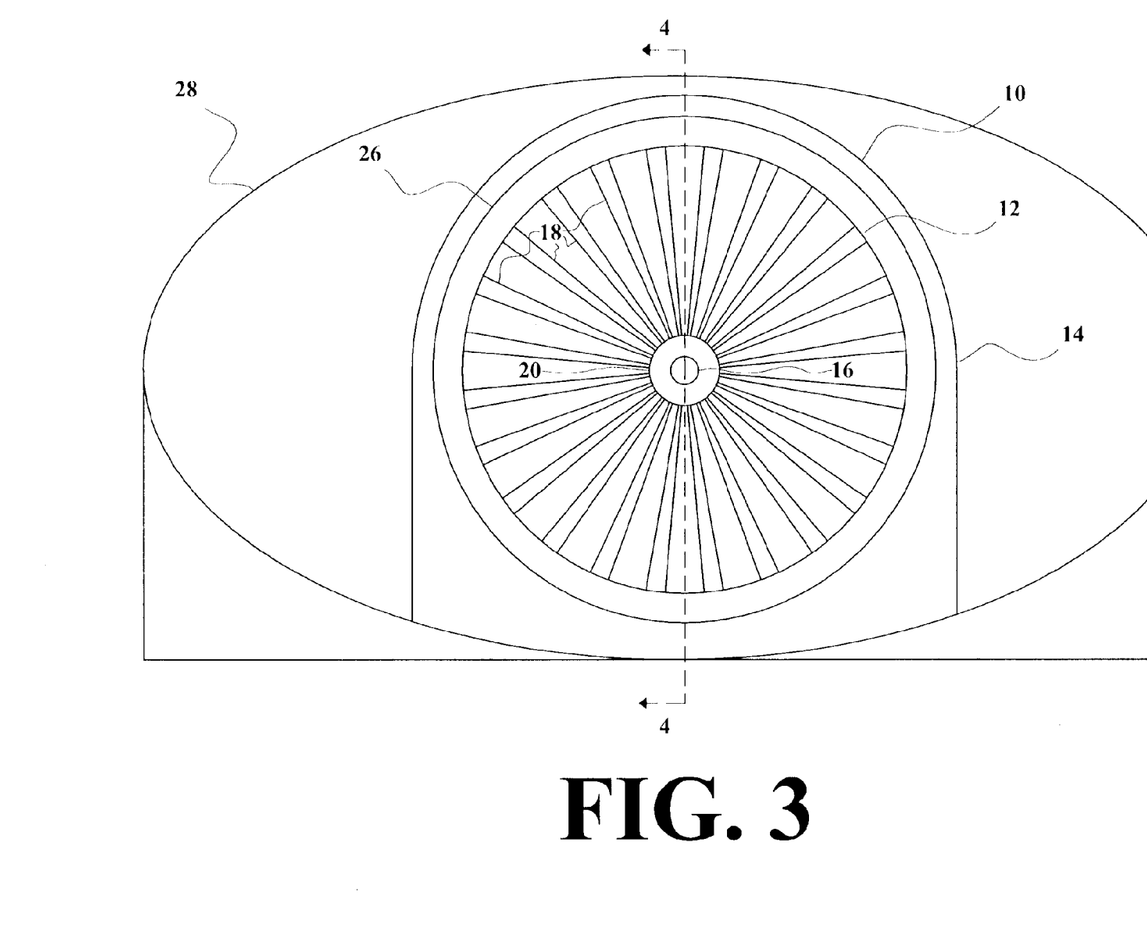
FIG. 3 is a front elevational view of the first preferred embodiment of the invention, with an optional current acceleration shroud.
Figure 4:
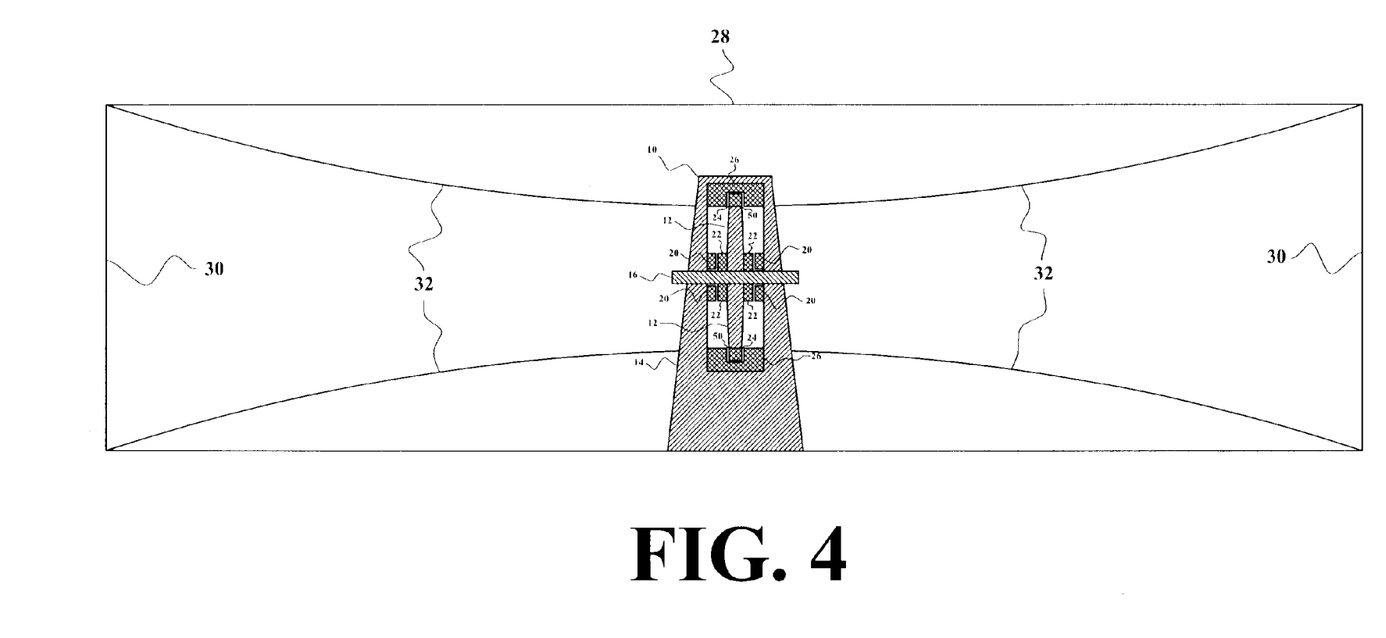
FIG. 4 is a sectional view of the first preferred embodiment of the invention, with the optional current acceleration shroud, drawn along line 4-4 of FIG. 3.

FIG. 3 is a front elevational view of the first preferred embodiment of the invention, showing the optional current acceleration shroud 28. FIG. 4 is a sectional view of the first preferred embodiment of the invention, drawn along line 4-4 of FIG. 3, again showing the optional current acceleration shroud 28. The shroud accelerates the current through a more constricted area, taking advantage of the Bernoulli effect and the cube-power relationship between the velocity of the working medium (e.g., seawater) and the power of the current. Water flows in and out the end openings 30, and is constricted by walls 32. (Some details shown in FIG. 1 are omitted from FIG. 4, to avoid making the drawing too cluttered.)

Figure 5:
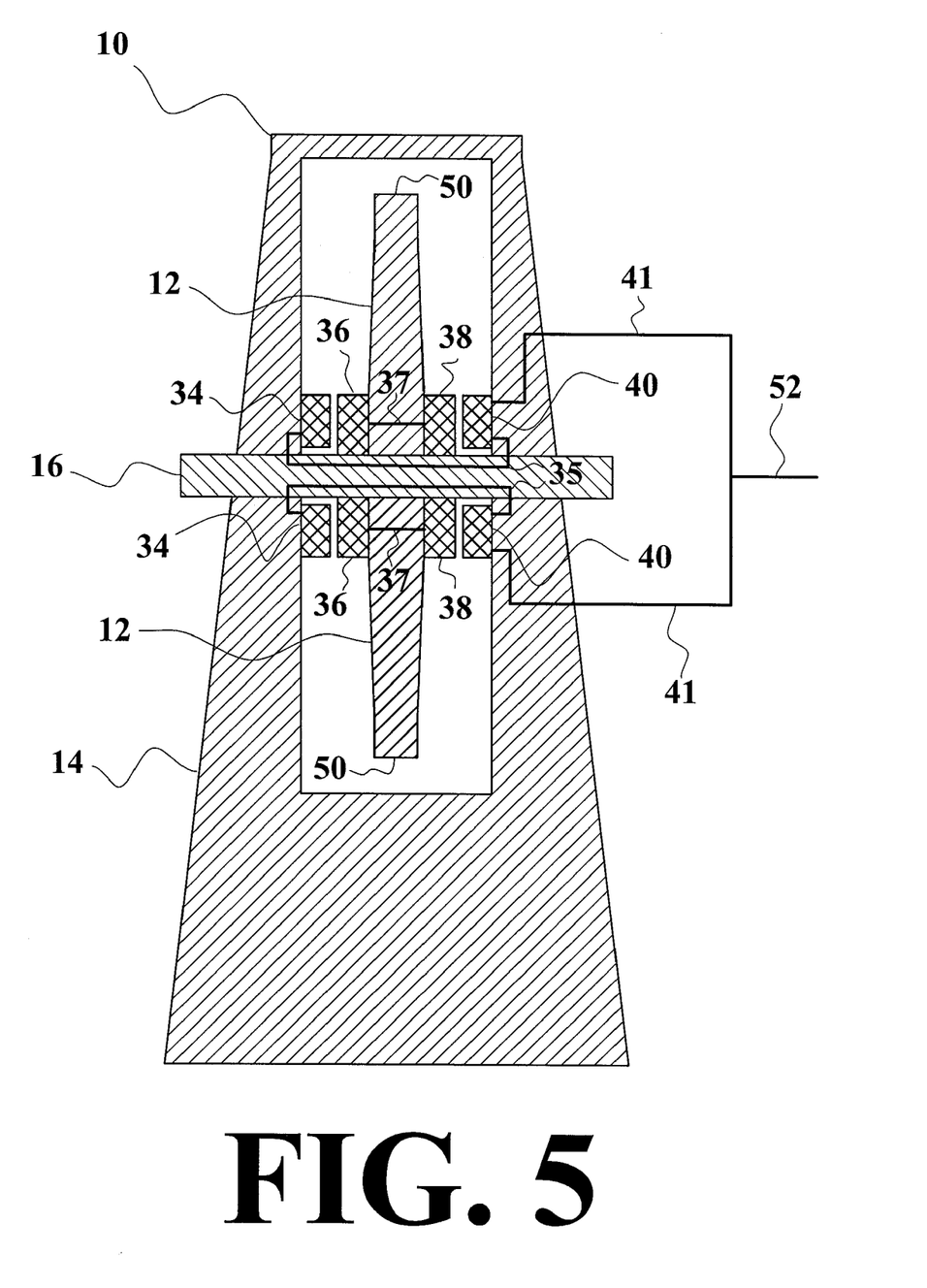
FIG. 5 is a sectional view of the second preferred embodiment of the invention.

FIG. 5 is a sectional view of the second preferred embodiment of the invention, which is the same as the first preferred embodiment, except that all four sets of electromagnetic coils 34, 36, 38 and 40 are adjacent to the shaft 16. The first set of electromagnetic coils 34 and the fourth set of electromagnetic coils 40 are attached to the shaft (or to the frame 14 adjacent to the shaft) and thus are stationary, and the second set of electromagnetic coils 36 and the third set of electromagnetic coils 38 are near the shaft but are attached to the impeller 12 and thus rotate with the impeller. Preferably, all of the sets of coils encircle the shaft. As before, the first and fourth sets of coils are electrically connected by power feeds 35, as are the second and third sets by power feeds 37. The first electric current is transmitted from the second set of coils 36 to the third set of coils 38 by power leads 37. A first portion of the second electric current is fed back from the fourth set of coils 40 to the first set of coils 34 through power leads 35, and a second portion is transmitted from the fourth set of coils through power leads 41 to the undersea transmission line 52.

Figure 6:
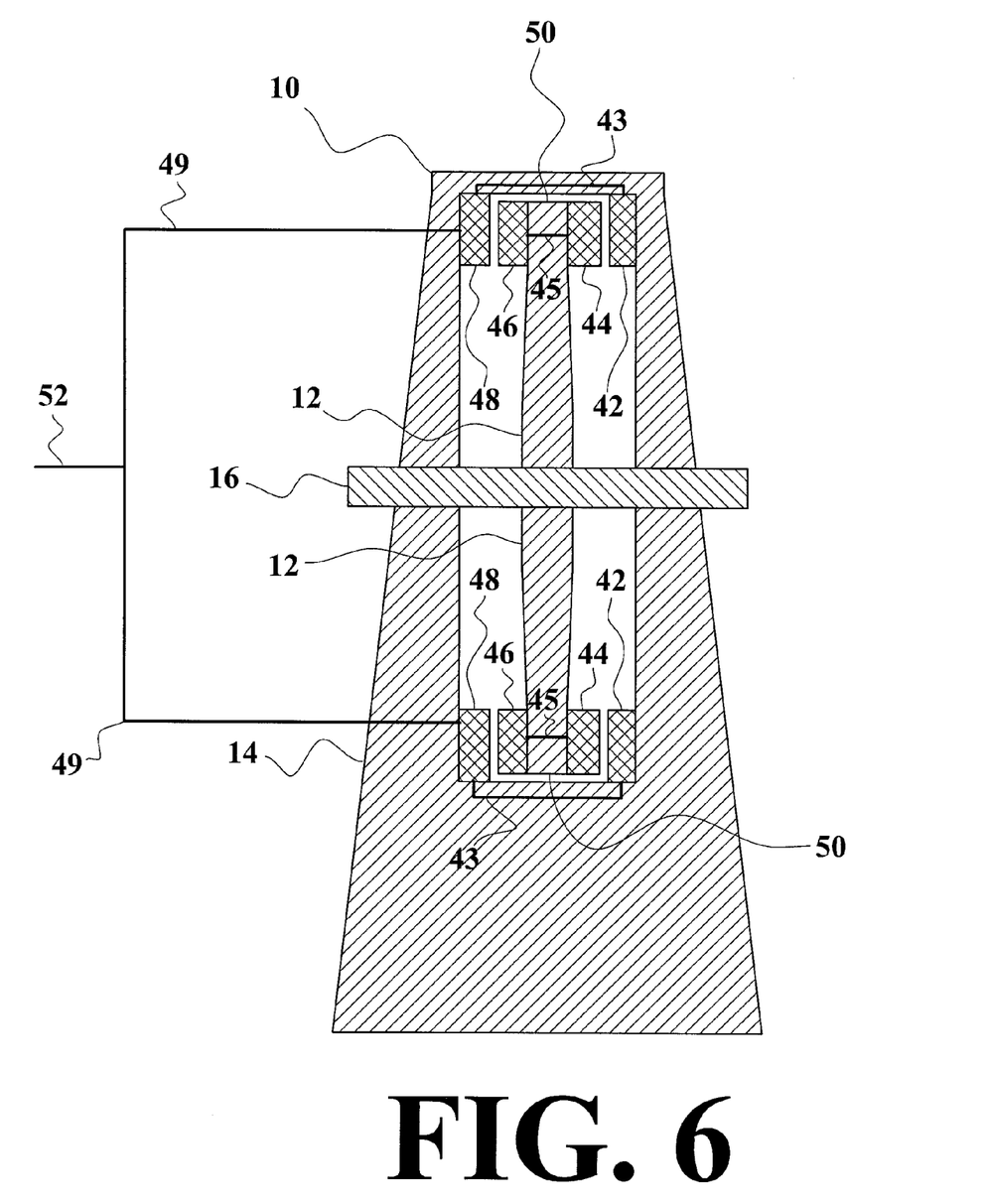
FIG. 6 is a sectional view of the third preferred embodiment of the invention.

FIG. 6 is a sectional view of the third preferred embodiment of the invention, which is the same as the first preferred embodiment, except that all four sets of electromagnetic coils 42, 44, 46 and 48 are adjacent to the rim or periphery 50 of the impeller 16. The first set of electromagnetic coils 42 and the fourth set of electromagnetic coils 48 are attached to the frame 14 and thus are stationary, and the second set of electromagnetic coils 44 and the third set of electromagnetic coils 46 are attached to the periphery of the impeller 12 and thus rotate with the impeller. Preferably, all of the sets of coils are circular or toroidal. Again, the first and fourth sets of coils are electrically connected by power leads 43, as are the second and third sets by power leads 45. The first electric current is transmitted from the second set of coils 44 to the third set of coils 46 by power leads 45. A first portion of the second electric current is fed back from the fourth set of coils 48 to the first set of coils 42 through power leads 45, and a second portion is transmitted from the fourth set of coils through power leads 49 to the undersea transmission line 52.

Figure 7:
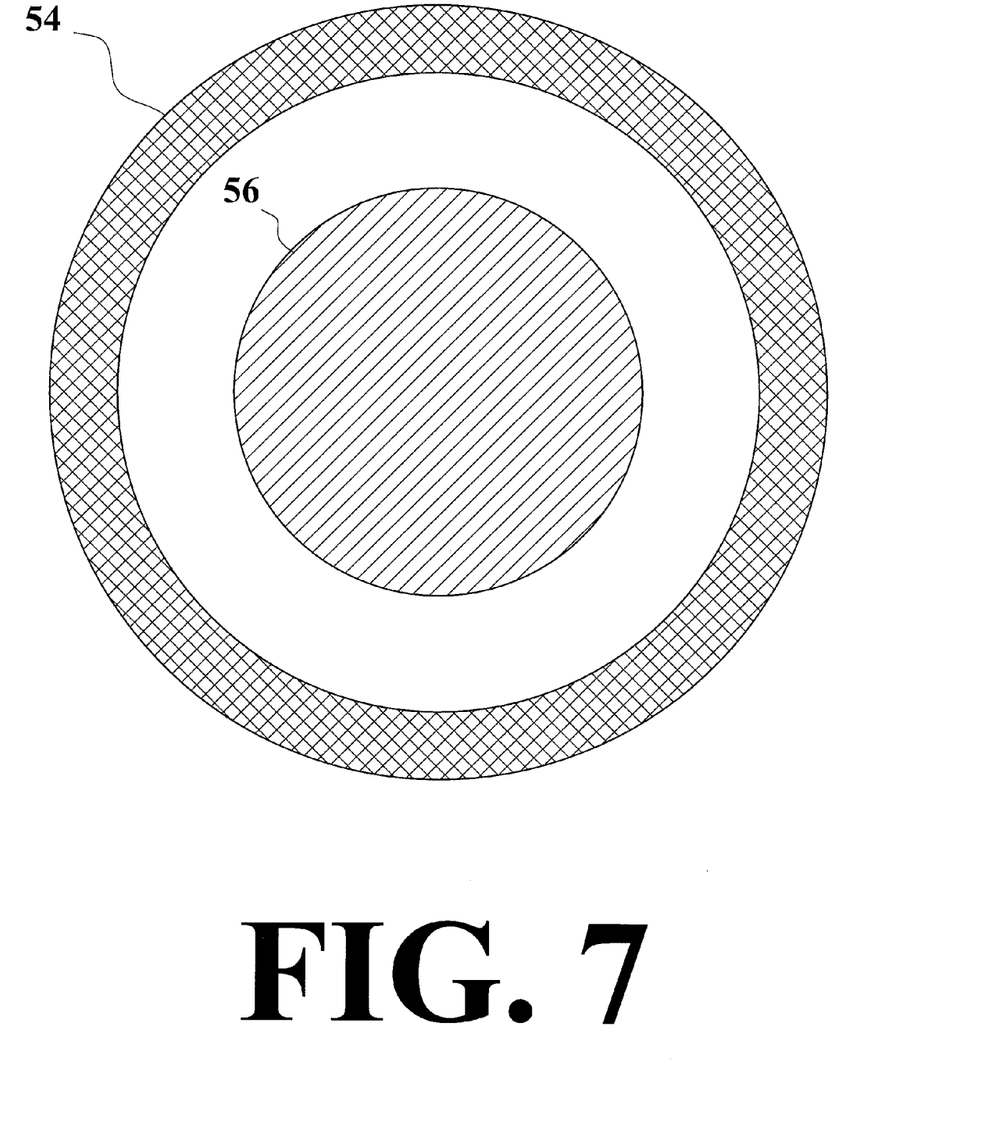
FIG. 7 is a top plan view of an electromagnetic coil with a ferromagnetic core, that may be used in any of the preferred embodiments of the invention.
Figure 8:
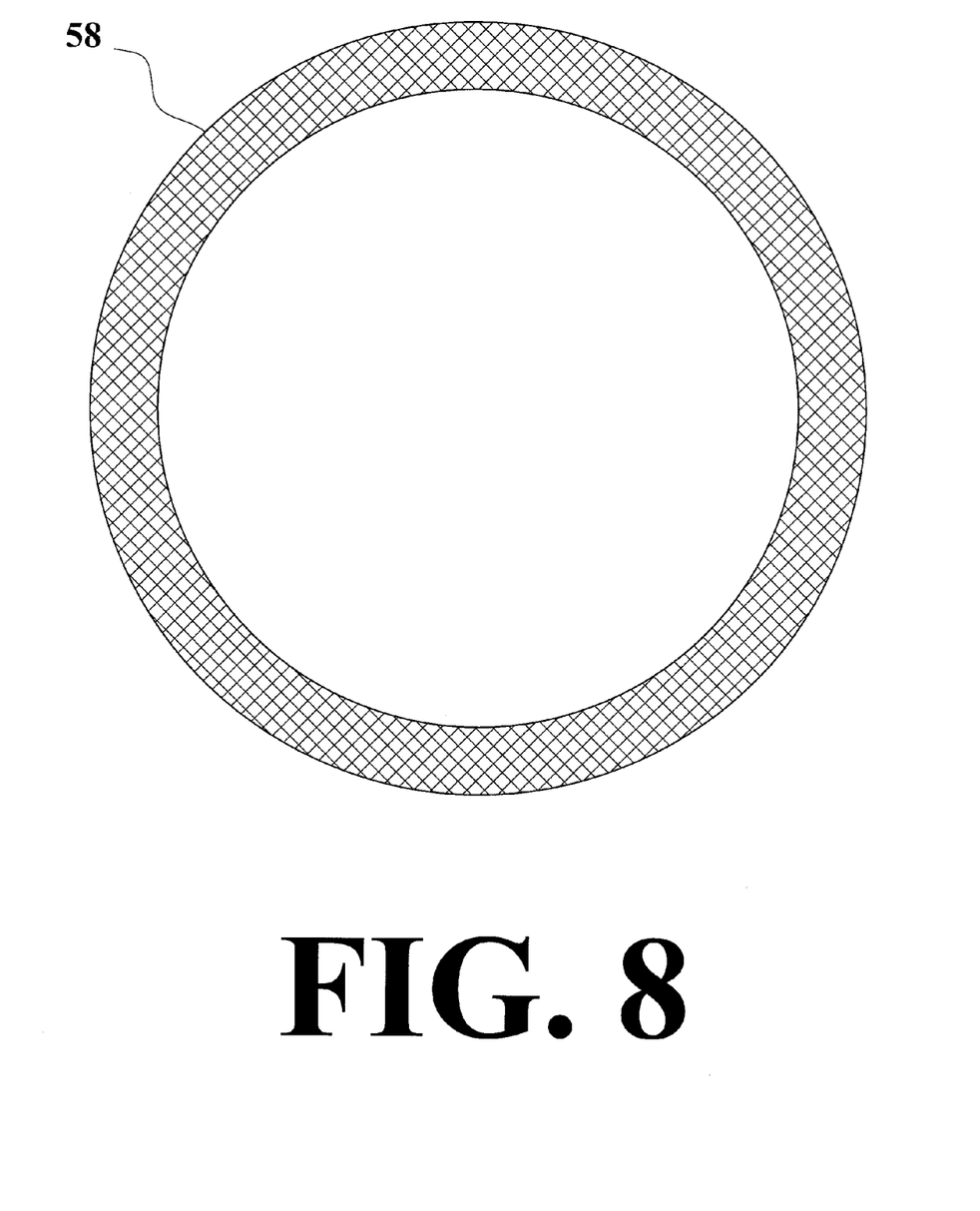
FIG. 8 is a top plan view of an electromagnetic coil with an empty core, that may be used in any of the preferred embodiments of the invention.

For all of the embodiments, the electromagnetic coils are preferably ferromagnetic. Any of the sets of electromagnetic coils may be wrapped around a ferromagnetic core, or they may have an air core or other empty core. FIG. 7 shows an electromagnetic coil 54 wrapped around a ferromagnetic core 56. FIG. 8 shows an electromagnetic coil 58 with an empty core.

It is to be understood that the present invention is not limited to the embodiments described above, but encompasses any and all embodiments within the scope of the following claims.

What is claimed is:

1. An apparatus for generating electrical power from ocean currents, comprising:
    an impeller set within a frame in which it can rotate about a shaft;
    a first set of electromagnetic coils adjacent to the shaft, that remain in a fixed position;
    a second set of electromagnetic coils attached to the impeller adjacent to the first set of electromagnetic coils, said second set of electromagnetic coils rotating past the first set of electromagnetic coils when the impeller rotates;
    a third set of electromagnetic coils attached to a periphery of the impeller, said third set of electromagnetic coils being electrically connected to said second set of electromagnetic coils; and
    a fourth set of electromagnetic coils attached to the frame adjacent to the third set of electromagnetic coils, said third set of electromagnetic coils rotating past the fourth set of electromagnetic coils when the impeller rotates and said fourth set of coils being electrically connected to said first set of coils and being electrically connected to the apparatus's power output connectors.

2. The apparatus for generating electrical power from ocean currents according to claim 1, wherein:
    the rotation of the second set of electromagnetic coils past the first set of electromagnetic coils generates a first electric current that is transmitted from the second set of electromagnetic coils to the third set of electromagnetic coils.

3. The apparatus for generating electrical power from ocean currents according to claim 2, wherein:
    the rotation of the third set of electromagnetic coils past the fourth set of electromagnetic coils generates a second electric current, a first portion of which is transmitted from the fourth set of electromagnetic coils to the first set of electromagnetic coils, and a second portion of which is transmitted from the fourth set of electromagnetic coils to provide electric power.

4. The apparatus for generating electrical power from ocean currents according to claim 3, wherein:
    the frame is enclosed in a shroud that accelerates ocean currents by funneling them through a more constricted space to increase the speed of rotation of the impeller.

5. The apparatus for generating electrical power from ocean currents according to claim 4, wherein:
  electric power is transmitted from the first set of electromagnetic coils via an undersea transmission line and a shore-based transmission station to a local power grid.

6. The apparatus for generating electrical power from ocean currents according to claim 5, wherein:
  at least one of the first through fourth sets of electromagnetic coils is wrapped around a ferromagnetic core; and
  the shaft is non-rotating.

7. The apparatus for generating electrical power from ocean currents according to claim 5, wherein:
  at least one of the first through fourth sets of electromagnetic coils has an empty core; and
  the shaft is non-rotating.

8. An apparatus for generating electrical power from ocean currents, comprising:
  an impeller set within a frame in which it can rotate about a shaft;
  a first set of electromagnetic coils adjacent to the shaft, that remain in a fixed position;
  a second set of electromagnetic coils attached to the turbine adjacent to the first set of electromagnetic coils, said second set of electromagnetic coils rotating about the shaft when the impeller rotates;
  a third set of electromagnetic coils attached to the impeller, said third set of electromagnetic coils also rotating about the shaft when the impeller rotates, and said third set of electromagnetic coils being electrically connected to said second set of electromagnetic coils; and
  a fourth set of electromagnetic coils adjacent to the shaft, that remain in a fixed position, and are adjacent to the third set of electromagnetic coils and said fourth set of coils being electrically connected to said first set of coils and being electrically connected to the apparatus's power output connectors.

9. The apparatus for generating electrical power from ocean currents according to claim 8, wherein:
  the rotation of the second set of electromagnetic coils past the first set of electromagnetic coils generates a first electric current that is transmitted from the second set of electromagnetic coils to the third set of electromagnetic coils.

10. The apparatus for generating electrical power from ocean currents according to claim 9, wherein:
  the rotation of the third set of electromagnetic coils past the fourth set of electromagnetic coils generates a second electric current, a first portion of which is transmitted from the fourth set of electromagnetic coils to the first set of electromagnetic coils, and a second portion of which is transmitted from the fourth set of electromagnetic coils to provide electric power.

11. The apparatus for generating electrical power from ocean currents according to claim 10, wherein:
  the frame is enclosed in a shroud that accelerates ocean currents by funneling them through a more constricted space to increase the speed of rotation of the impeller.

12. The apparatus for generating electrical power from ocean currents according to claim 11, wherein:
  electric power is transmitted from the fourth set of electromagnetic coils via an undersea transmission line and a shore-based transmission station to a local power grid.

13. The apparatus for generating electrical power from ocean currents according to claim 12, wherein:
  at least one of the first through fourth sets of electromagnetic coils is wrapped around a ferromagnetic core; and
  the shaft is non-rotating.

14. The apparatus for generating electrical power from ocean currents according to claim 12, wherein:
  at least one of the first through fourth sets of electromagnetic coils has an empty core; and
  the shaft is non-rotating.

15. An apparatus for generating electrical power from ocean currents, comprising:
  an impeller set within a frame in which it can rotate about a shaft;
  a first set of electromagnetic coils attached to the frame, adjacent to a periphery of the impeller, that remain in a fixed position;
  a second set of electromagnetic coils attached to the periphery of the impeller, adjacent to the first set of electromagnetic coils, with the second set of electromagnetic coils rotating past the first set of electromagnetic coils when the impeller rotates;
  a third set of electromagnetic coils attached to the periphery of the impeller, said third set of electromagnetic coils being electrically connected to said second set of electromagnetic coils; and
  a fourth set of electromagnetic coils attached to the frame in a fixed position, adjacent to the third set of electromagnetic coils, said third set of electromagnetic coils rotating past the fourth set of electromagnetic coils when the impeller rotates and said fourth set of coils being electrically connected to said first set of coils and being electrically connected to the apparatus's power output connectors.

16. The apparatus for generating electrical power from ocean currents according to claim 15, wherein:
  the rotation of the second set of electromagnetic coils past the first set of electromagnetic coils generates a first electric current that is transmitted from the second set of electromagnetic coils to the third set of electromagnetic coils.

17. The apparatus for generating electrical power from ocean currents according to claim 16, wherein:
  the rotation of the third set of electromagnetic coils past the fourth set of electromagnetic coils generates a second electric current, a first portion of which is transmitted from the fourth set of electromagnetic coils to the first set of electromagnetic coils, and a second portion of which is transmitted from the fourth set of electromagnetic coils to provide electric power.

18. The apparatus for generating electrical power from ocean currents according to claim 17, wherein:
  the frame is enclosed in a shroud that accelerates ocean currents by funneling them through a more constricted space to increase the speed of rotation of the impeller.

19. The apparatus for generating electrical power from ocean currents according to claim 18, wherein:
  electric power is transmitted from the fourth set of electromagnetic coils via an undersea transmission line and a shore-based transmission station to a local power grid.

20. The apparatus for generating electrical power from ocean currents according to claim 19, wherein:
  at least one of the first through fourth sets of electromagnetic coils is wrapped around a ferromagnetic core; and
  the shaft is non-rotating.

\* \* \* \* \*